US011940137B2

(12) United States Patent
Wang et al.

(10) Patent No.: US 11,940,137 B2
(45) Date of Patent: Mar. 26, 2024

(54) EXPLOSION-PROOF LAMP

(71) Applicant: EATON INTELLIGENT POWER LIMITED, Dublin (IE)

(72) Inventors: Chunhuai Wang, Shanghai (CN); Haijun Man, Shanghai (CN); Yuru Li, Shanghai (CN); Rotton Lu, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/794,606

(22) PCT Filed: Jan. 22, 2021

(86) PCT No.: PCT/IB2021/000020

§ 371 (c)(1),
(2) Date: Jul. 21, 2022

(87) PCT Pub. No.: WO2021/148879

PCT Pub. Date: Jul. 29, 2021

(65) Prior Publication Data

US 2023/0071049 A1 Mar. 9, 2023

(30) Foreign Application Priority Data

Jan. 22, 2020 (CN) ......................... 202020143513.9

(51) Int. Cl.
*F21V 25/12* (2006.01)
*F21V 15/01* (2006.01)
*F21V 29/77* (2015.01)

(52) U.S. Cl.
CPC .............. *F21V 25/12* (2013.01); *F21V 15/01* (2013.01); *F21V 29/773* (2015.01)

(58) Field of Classification Search
CPC ......... F21V 25/12; F21V 15/01; F21V 29/773
See application file for complete search history.

(56) References Cited

U.S. PATENT DOCUMENTS 4,425,609 A 1/1984 Grindle
9,714,762 B2 * 7/2017 Wu ........................... F21V 5/04
(Continued)

FOREIGN PATENT DOCUMENTS

CN 203010328 U 6/2013
CN 105546495 A 5/2016
(Continued)

OTHER PUBLICATIONS

IPRP received for International Application No. PCT/IB2021/000020, 8 pages, Jul. 26, 2022.

*Primary Examiner* — Tsion Tumebo
(74) *Attorney, Agent, or Firm* — Baker Botts L.L.P.

(57) ABSTRACT

The explosion-proof lamp provided includes a light source cavity and a drive cavity independent of each other. The drive cavity is has a power driver and a junction box, is connected to the light source cavity via a conducting wire, and drives and controls a light source in the light source cavity to be turned on. The light source cavity includes a heat sink, a glass cover, and the light source. The glass cover and the heat sink are connected to form the cavity, and the light source is mounted in the cavity. The heat sink includes a heat dissipation bottom plate and a plurality of heat dissipation fins annularly mounted on the heat dissipation bottom plate, absorbs heat generated in the light source cavity, and dissipates the heat into an external environment.

11 Claims, 10 Drawing Sheets

(56) References Cited

U.S. PATENT DOCUMENTS

| | | | | |
|---|---|---|---|---|
| 10,260,722 | B2 * | 4/2019 | Treible, Jr. | F21V 5/04 |
| 2007/0253201 | A1 * | 11/2007 | Blincoe | F21V 25/12 362/294 |
| 2009/0135607 | A1 | 5/2009 | Holloway | |
| 2011/0194280 | A1 * | 8/2011 | Ruffin, Jr. | G06Q 30/0623 362/249.02 |
| 2011/0242828 | A1 * | 10/2011 | Blincoe | F21V 23/008 362/373 |
| 2012/0195041 | A1 * | 8/2012 | Fletcher | F21V 29/773 362/249.02 |
| 2015/0362156 | A1 | 12/2015 | Chien | |
| 2017/0045214 | A1 * | 2/2017 | Johnson | F21K 9/233 |
| 2018/0160509 | A1 * | 6/2018 | Treible, Jr. | F21V 23/002 |

FOREIGN PATENT DOCUMENTS

| | | | |
|---|---|---|---|
| CN | 206300093 | U | 7/2017 |
| KR | 101201153 | B1 | 11/2012 |
| KR | 20140136664 | A | 12/2014 |
| KR | 20180047491 | A | 5/2018 |

* cited by examiner

EXPLOSION-PROOF LAMP

PRIORITY

This application claims the benefit under 35 U.S.C. § 371 of International Patent Application No. PCT IB2021/000020, filed 22 Jan. 2021, which is incorporated herein by reference.

TECHNICAL FIELD

The present utility model relates to the technical field of illumination devices, and in particular to an explosion-proof lamp.

BACKGROUND

At extreme low/high ambient temperatures, in outdoor or indoor regions where flammable gas, dust, fibers, airborne fluffy matter, or the like exists, in extremely corrosive or humid environments, in hazardous regions for performing machining and manufacturing, and in hazardous fields such as pharmacy, petrochemical, and the like, continuous, stable and efficient illumination lamps are needed.

An explosion-proof lamp is an electrical device applied in the aforementioned extreme environments, and is different from an ordinary lamp in that the explosion-proof lamp needs to meet specific protection requirements.

In conventional explosion-proof lamps, metal halide lamps, incandescent lamps, sodium lamps, fluorescent lamps, and the like are used as main light sources, so that power consumption is high, and the lamps and the light sources have high temperatures, are prone to break, produce a large amount of heat, have a short service life, and severely affect production safety. In addition, due to the national energy conservation and emission reduction policies, LED light sources emerge accordingly.

LED light sources have high luminous efficiency and high color rendering performance, are small, have a long service life, are gradually taking the place of conventional light sources, and are applied in various lamps. Output of a driving power supply required by an explosion-proof LED lamp is a low DC voltage, and can hardly generate sparks. Therefore, explosion-proof LED lamps are safer than other explosion-proof lamps.

However, an LED light source is sensitive to temperatures. Heat dissipation is one of key issues that need to be resolved in designing an LED lamp. In order to ensure a service life of an LED lamp, an appropriate heat dissipation method has to be adopted to transfer in a timely manner heat energy generated by the LED lamp. Since an explosion-proof lamp needs to meet protection requirements, a light source and a power supply both need to be mounted in a protective enclosure, thereby increasing difficulty in heat dissipation of an explosion-proof LED lamp.

The Chinese utility model patent CN 201954378 U provides an integrated flameproofness-based explosion-proof lamp, including at least an electrical box and a lamp portion, and further including a connecting portion. The connecting portion is respectively fixedly connected to the electrical box and the lamp portion, so that the electrical box and the lamp portion form an integrated structure. This integrated flameproofness-based explosion-proof lamp has the following defects: an integrated flameproof structure causes a cavity wall of the electrical box and the lamp portion to be extremely thick, which increases the weight and costs of the entire lamp, and affects heat dissipation of the entire lamp, thereby affecting a service life of the lamp.

SUMMARY

An objective of the present utility model is to provide an explosion-proof lamp, so as to solve the problem in which an existing explosion-proof lamp has poor heat dissipation performance, and is heavy and expensive.

In order to achieve the aforementioned objective, the present utility model provides an explosion-proof lamp, comprising a light source cavity and a drive cavity independent of each other, wherein the drive cavity is an increased-safety cavity, is provided therein with a power driver and a junction box, is connected to the light source cavity via a conducting wire by means of an insulating sleeve, and drives and controls a light source in the light source cavity to be turned on;

the light source cavity is a flameproof cavity, and comprises a heat sink, a glass cover, and the light source;

the glass cover and the heat sink are connected to form the cavity, and the light source is mounted in the cavity;

the heat sink comprises a heat dissipation bottom plate and a plurality of heat dissipation fins annularly mounted on the heat dissipation bottom plate, absorbs heat generated in the light source cavity, and dissipates the heat into an external environment.

In an embodiment, the heat dissipation fins of the heat sink are separately distributed in a radial annular form;

outer contours of all of the heat dissipation fins of the heat sink form a cylinder.

In an embodiment, the heat dissipation fins of the heat sink are separately distributed in a radial annular form;

outer contours of all of the heat dissipation fins of the heat sink form a truncated cone.

In an embodiment, the explosion-proof lamp further comprises an isolation column provided between the heat sink of the light source cavity and the drive cavity and used to control spacing between the light source cavity and the drive cavity.

In an embodiment, in the light source cavity, the LED light source is mounted on a mounting plate, and the mounting plate is mounted on the heat dissipation bottom plate of the heat sink.

In an embodiment, a cable of the drive cavity sequentially passes through a hole in a drive cavity bottom plate and a hole in the heat dissipation bottom plate, and is connected to the light source in the light source cavity.

In an embodiment, the explosion-proof lamp further comprises an upper cover connected to the drive cavity and used to close the drive cavity and provide a mounting position for the explosion-proof lamp.

In an embodiment, a metal mesh is further provided on an outer side of the glass cover, and surrounds the glass cover from the outer side.

In an embodiment, a seal ring is mounted between the glass cover and the metal mesh. In an embodiment, a seal ring is mounted between the upper cover and the drive cavity;

a seal ring is mounted between the glass cover and the heat sink.

The present utility model provides an explosion-proof lamp; the drive cavity is an increased-safety cavity; the light source cavity is a flameproof cavity; the drive cavity and the light source cavity are independent of each other, thereby facilitating heat dissipation on a surface of a lamp housing and a power driver.

An explosion-proof lamp provided by the present utility model specifically has the following beneficial effects:

1) An LED light source is used, has high luminous efficiency, produces less heat, has an operating voltage being a safe and low voltage, is safe and reliable, has a long service life, conserves energy, is environmentally friendly, produces no pollution, and is resistant to vibration and impact.

2) The drive cavity is an increased-safety cavity; a wall thickness of the drive cavity is relatively small, thereby reducing costs and weight, and facilitating maintenance.

3) Heat sinks of different shapes dissipate heat to the outside by means of heat dissipation fins, thereby ensuring a long service life and normal operation of the LED light source.

4) The isolation column is provided to adjust a distance between the drive cavity and the light source cavity, thereby further reducing a temperature of the power driver.

BRIEF DESCRIPTION OF THE DRAWINGS

The aforementioned and other features, properties, and advantages of the present utility model will become more apparent via the following description provided with reference to the accompanying drawings and embodiments. In the accompanying drawings, the same reference numerals always indicate the same features. Wherein.

Figure 1:
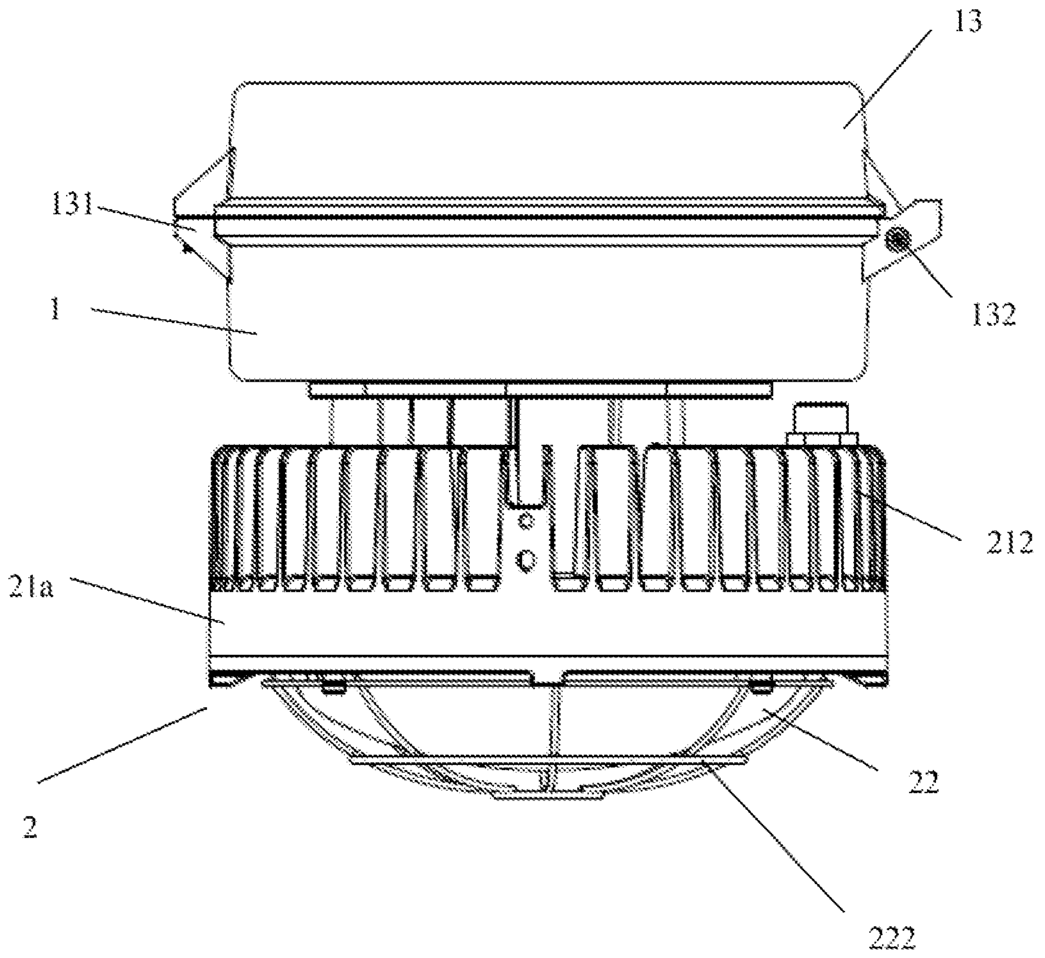
FIG. 1 is a schematic view of an overall structure of an explosion-proof lamp according to a first embodiment of the present utility model.

Meanings of reference numerals in the accompanying drawings are shown below:

1 drive cavity;
11 power driver;

12 junction box;
13 upper cover;
131 rotary component;
132 fastener;
2 light source cavity;
21*a* heat sink;
21*b* heat sink;
211 heat dissipation bottom plate;
212 heat dissipation fin;
22 glass cover;
221 metal frame;
222 metal mesh;
23 light source;
24 mounting plate;
25 seal ring;
26 seal ring;
3 isolation column.

DETAILED DESCRIPTION OF THE EMBODIMENTS

To make objectives, technical solutions, and advantages of the present utility model clearer and more comprehensible, the present utility model is described in further detail below with reference to the accompanying drawings and embodiments. It should be appreciated that the specific embodiments described herein are merely intended to explain the utility model rather than limit the utility model.

Common types of explosion-proof LED lamps divided according to explosion-proof types include: a flameproof type, an increased-safety type, an intrinsic safety type, a pressurized enclosure type, and the like. With respect to an explosion-proof structure, an explosion-proof LED lamp is not different from any other light source of the same explosion-proof type. However, due to a light-emitting LED module, an LED temperature needs to be controlled to reach a temperature group and a temperature range of a corresponding flammable gas or vapor.

The flameproof type is an explosion-proof type in which measures are taken to allow an internal explosion and prevent a flame from propagating the explosion, and is a most common explosion-proof type. The flameproof type uses a flameproof enclosure to prevent an explosion. The flameproof enclosure can bear an explosion pressure caused by an internal explosive gas mixture, and prevent an internal explosion from being propagated to an explosive mixture around the enclosure. This is a gap-based explosion-proof principle, namely a structure designed on the basis of the principle that a metal gap can prevent propagation of a flame of an explosion and cool an explosion product, thereby extinguishing the flame, lowering a temperature, and suppressing expansion of the explosion.

An increased-safety electrical device refers to an electrical device having a device structure that, in a normal operating condition, does not generate an electric arc nor a spark and does not have the possibility of igniting an explosive mixture, and further measures are taken to improve the safety of the electrical device to eliminate possibilities of resulting in a dangerous temperature or incurring an electric arc or a spark.

Explosion-proof lamps provided by the present utility model include three embodiments having different power and/or output lumen values and having slightly different sizes and structures. Detailed description is provided below.

Figure 2:
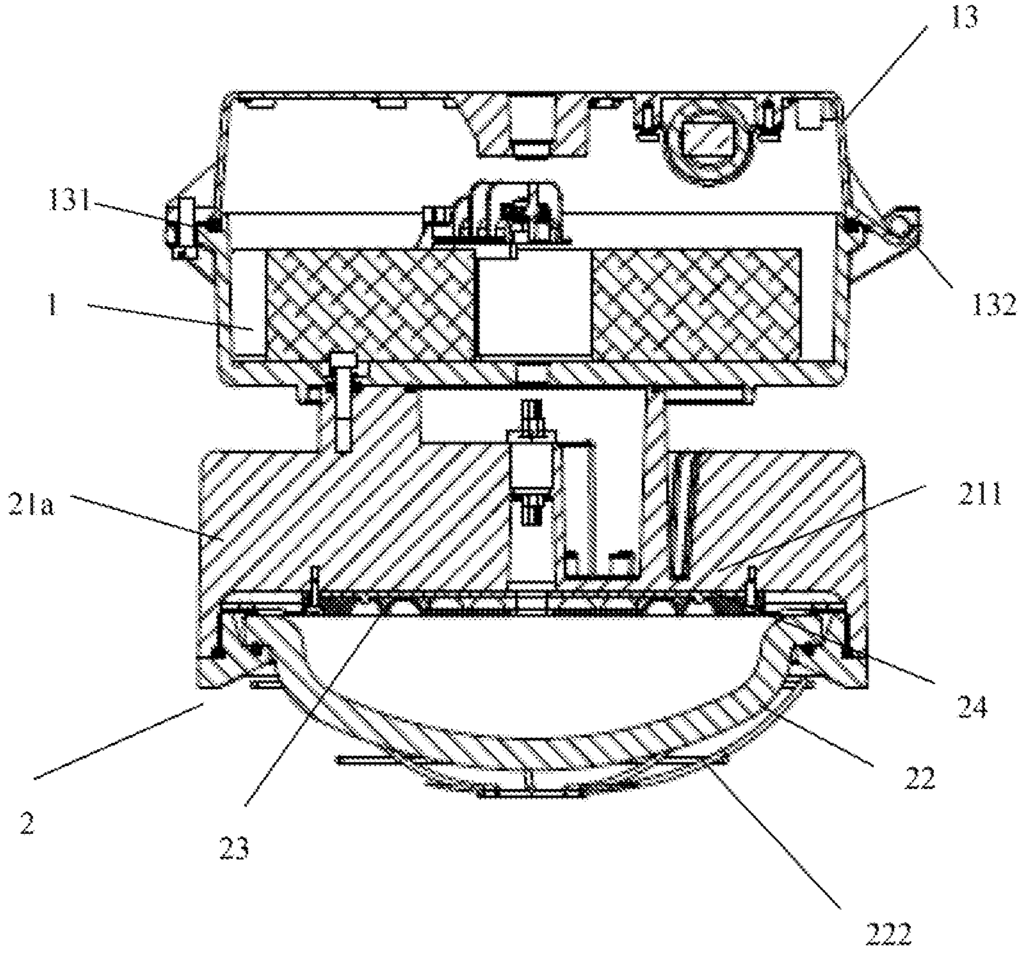
FIG. 2 is a sectional view of the explosion-proof lamp according to the first embodiment of the present utility model.

FIG. 1 and FIG. 2 are respectively a schematic view of an overall structure of an explosion-proof lamp according to a first embodiment of the present utility model and a sectional view of the explosion-proof lamp according to the first embodiment of the present utility model. In the first embodiment shown in FIG. 1 and FIG. 2, the explosion-proof lamp provided by the present utility model consists of a drive cavity 1 and a light source cavity 2 independent of each other, and the drive cavity 1 and the light source cavity 2 are connected via a conducting wire by means of an insulating sleeve. A temperature of a surface of a lamp housing in which the drive cavity 1 and the light source cavity 2 are separated from each other is much lower than a temperature of a surface of a lamp housing in which a drive cavity and a light source housing are integrated.

The drive cavity 1 is an increased-safety cavity, and the light source cavity 2 is a flameproof cavity.

Figure 3:
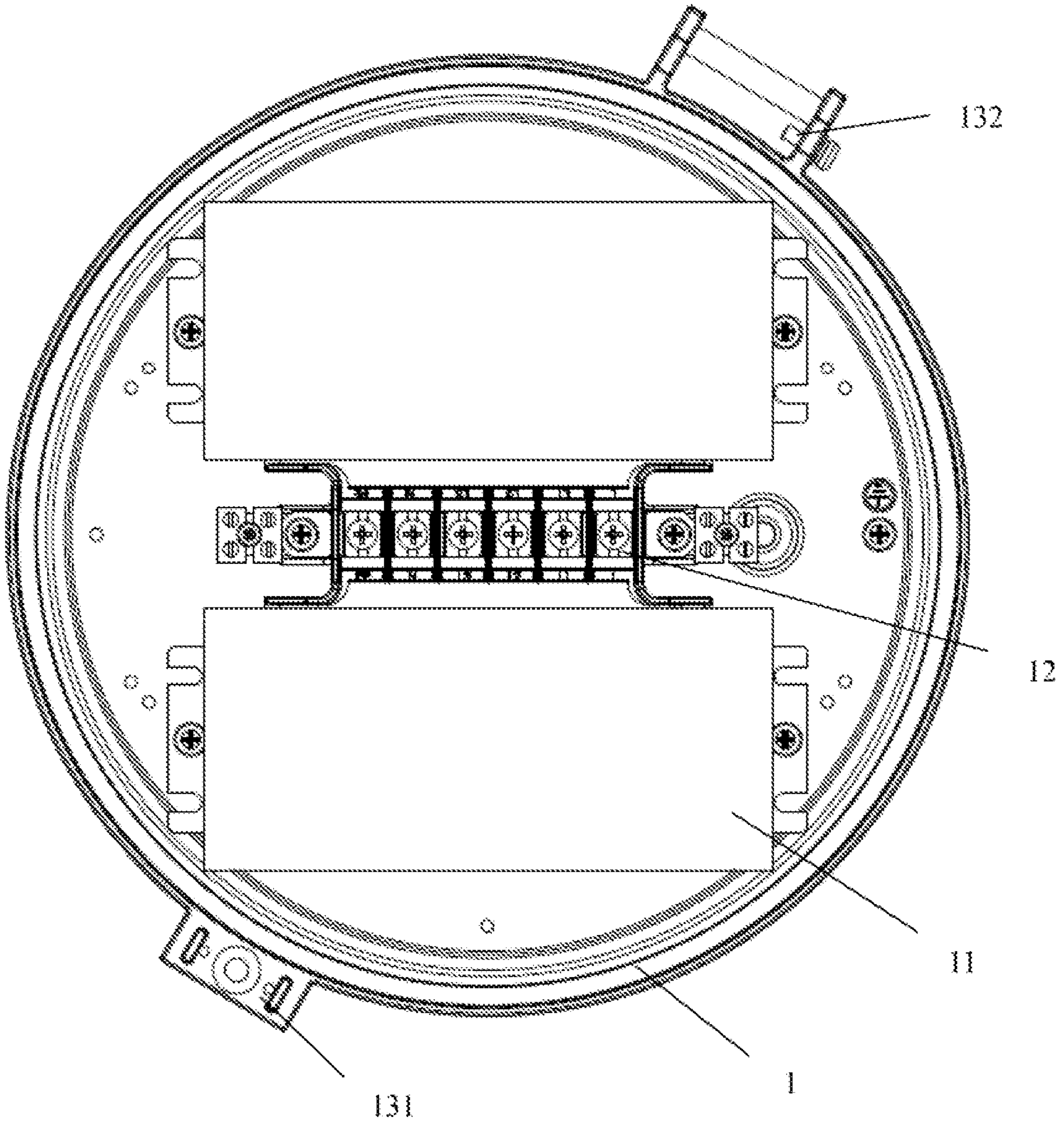
FIG. 3 is a top view of a drive cavity according to the first embodiment of the present utility model.

FIG. 3 is a top view of the drive cavity according to the first embodiment of the present utility model. As shown in FIG. 3, a power driver 11 and a junction box 12 are mounted in the drive cavity 1.

The power driver 11 drives and controls a light source 24 in the light source cavity 2 to be turned on. A corresponding power driver 11 is determined and used according to a specific light source configuration.

The junction box 12 is a wiring terminal, and allows a conducting wire to be easily connected.

The power driver 11 and the junction box 12 are encapsulated devices, and meet safety requirements on group I electrical devices. The power driver 11 and the junction box 12 are encapsulated in an encapsulation material, and therefore do not ignite a surrounding explosive mixture when operating normally and overloaded as approved or faulty as approved. In an embodiment, the drive cavity 1 meets the national standard "GB 3836.3-2000 Electrical Apparatus for Explosive Gas Atmospheres."

Further, the drive cavity 1 further includes an upper cover 13. Respective ends of the upper cover 13 and the drive cavity 1 are connected means of a rotary component 131, and respective other ends are fastened by means of a fastener 132. The fastener 132 is caused to no longer fasten the upper cover 13, and the upper cover 13 is opened by rotating the rotary component 131, so that the interior of the drive cavity 1 is exposed.

Optionally, the fastener 132 is a bolt or a screw.

Optionally, the rotary component 131 is a hinge.

The upper cover 13 covers the drive cavity 1, and provides a mounting position for the explosion-proof lamp. Depending on different mounting methods, the upper cover 13 has different shapes and structures.

Further, a seal ring is provided between the upper cover 13 and the drive cavity 1, thereby achieving the IP66 enclosure protection level. IP66 means that a product completely prevents intrusion from foreign bodies, and completely prevents dust from entering therein, and when subjected to severe impact from waves or a water jet, the amount of water entering an electrical device is not sufficient to harm the electrical device.

Optionally, the seal ring is an O ring, and is made of rubber.

The light source cavity 2 consists of a heat sink 21*a*, a glass cover 22, and a light source 23.

The heat sink 21*a* and the glass cover 22 are fixedly connected to form the cavity, and the light source 23 is mounted in the cavity.

The heat sink 21*a* includes a heat dissipation bottom plate 211 and a plurality of heat dissipation fins 212, absorbs heat generated in the light source cavity 2, and dissipates the heat into an external environment.

A through hole is provided in the middle of the heat dissipation bottom plate 211. A cable in the drive cavity 1 sequentially passes through a hole in a drive cavity bottom plate and a hole in the heat dissipation bottom plate 211, and is connected to the light source 23 in the light source cavity 2.

The heat dissipation fins 212 are annularly mounted on the heat dissipation bottom plate 211.

In the first embodiment shown in FIG. 1 and FIG. 2, the heat dissipation fins 212 are separately distributed in a radial annular form, and outer contours of all of the heat dissipation fins 212 form a cylinder.

Optionally, the heat dissipation fins 212 and the heat dissipation bottom plate 211 are integrally cast.

Optionally, the heat sink 21*a* is made of aluminum.

Further, the light source cavity 2 further includes a mounting plate 24.

The light source 23 is an LED light source, and is mounted on the mounting plate 24, and the mounting plate 24 is further mounted on the heat dissipation bottom plate 211, so that heat generated by the light source 23 is conducted out by the heat dissipation bottom plate 211 and the heat dissipation fins 212. The mounting plate 24 is an aluminum base plate. In the light source cavity, the LED light source is mounted on the aluminum base plate, and the aluminum base plate is mounted on the heat dissipation bottom plate of the heat sink.

Figure 4A:
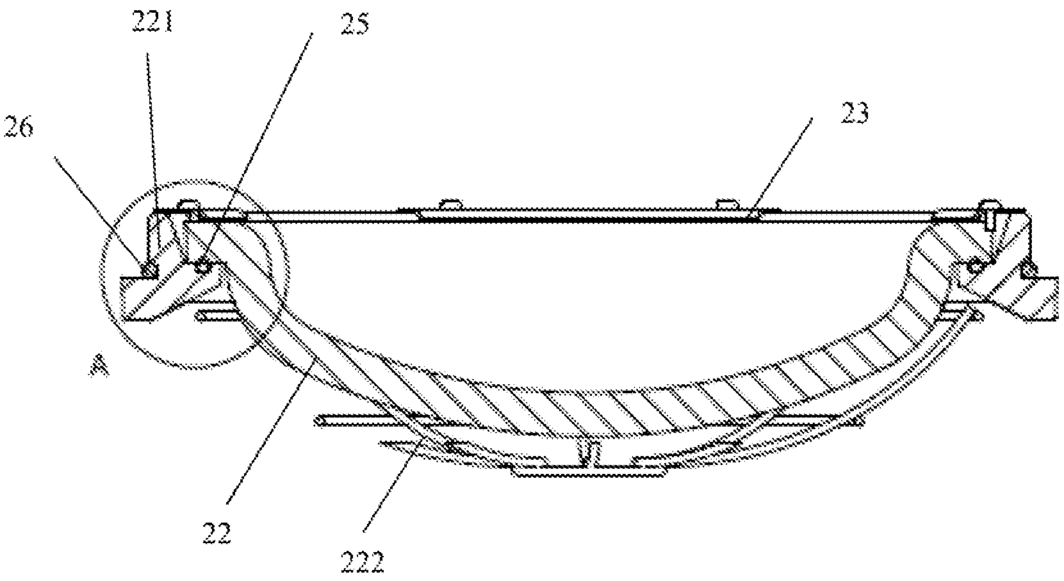
FIG. 4*a* is a perspective view of a glass cover according to the first embodiment of the present utility model.
Figure 4B:
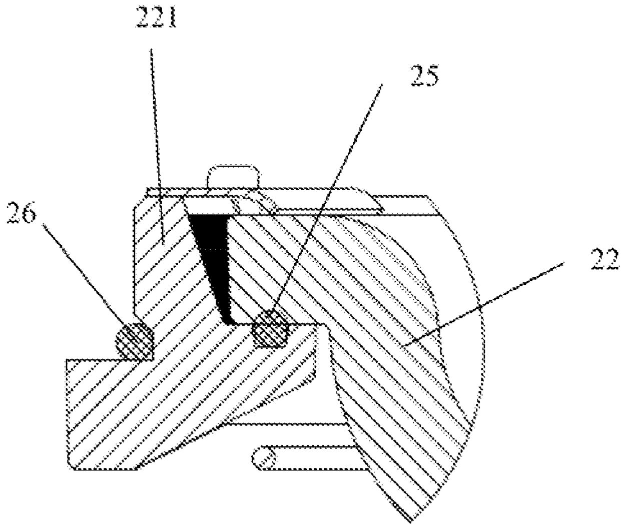
FIG. 4*b* is a top view of the glass cover according to the first embodiment of the present utility model.

FIG. 4*a* is a schematic view of connecting surfaces of the glass cover and the heat sink according to the first embodiment of the present utility model. FIG. 4*b* is a schematic partial view of the part in the circle shown in FIG. 4*a*. As shown in FIG. 4*a* and FIG. 4*b*, a metal frame 221 is provided on an outer side of the glass cover 22, and binds with the glass cover 22 by means of an adhesive.

The metal frame 221 is provided with a fixing holder for positioning the glass cover 22.

The metal frame 221 of the glass cover 22 and the heat dissipation bottom plate 211 of the heat sink 21*a* are threadingly connected to achieve explosion proofness based on flameproofness.

Further, a seal ring 25 is provided between the glass cover 22 and the metal frame 221, thereby achieving the IP66 enclosure protection level.

Further, a seal ring 26 is provided between the metal frame 221 and the heat sink 21*a*, thereby achieving the IP66 enclosure protection level.

Optionally, the seal ring 25 and the seal ring 26 are O rings, and are made of rubber.

Figure 5A:
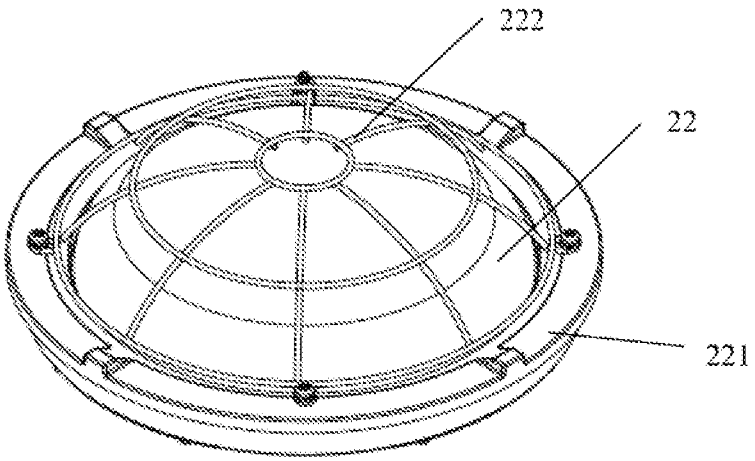
FIG. 5*a* is a schematic view of connecting surfaces of the glass cover and a heat sink according to the first embodiment of the present utility model.
Figure 5B:
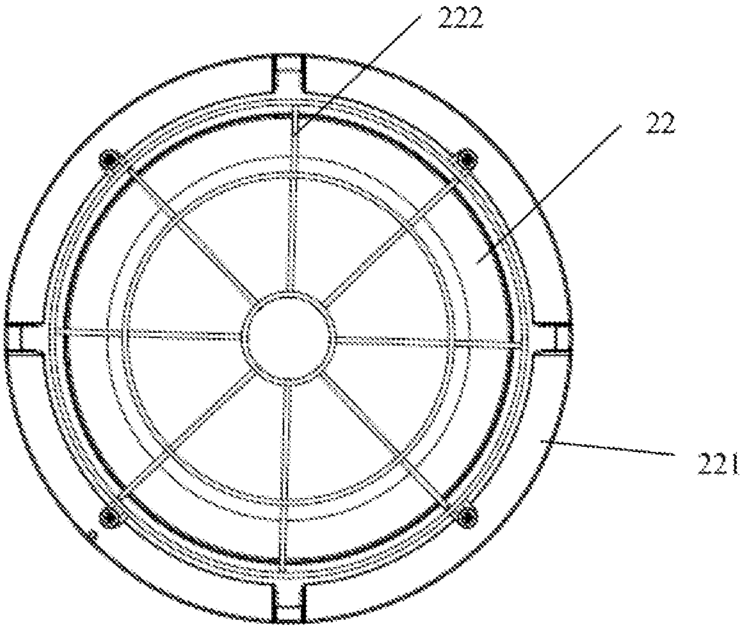
FIG. 5*b* is a schematic partial view of the connecting surfaces of the glass cover and the heat sink according to the first embodiment of the present utility model.

FIG. 5*a* and FIG. 5*b* are respectively a perspective view and a top view of the glass cover according to the first embodiment of the present utility model. As shown in FIG. 5*a* and FIG. Sb, a metal mesh 222 is further provided on the outer side of the glass cover 22, and surrounds the glass cover 22 from the outer side. The metal mesh 222 is fixed on the metal frame 221, has an explosion-proof function, and prevent glass from cracking due to a severe impact.

Figure 6:
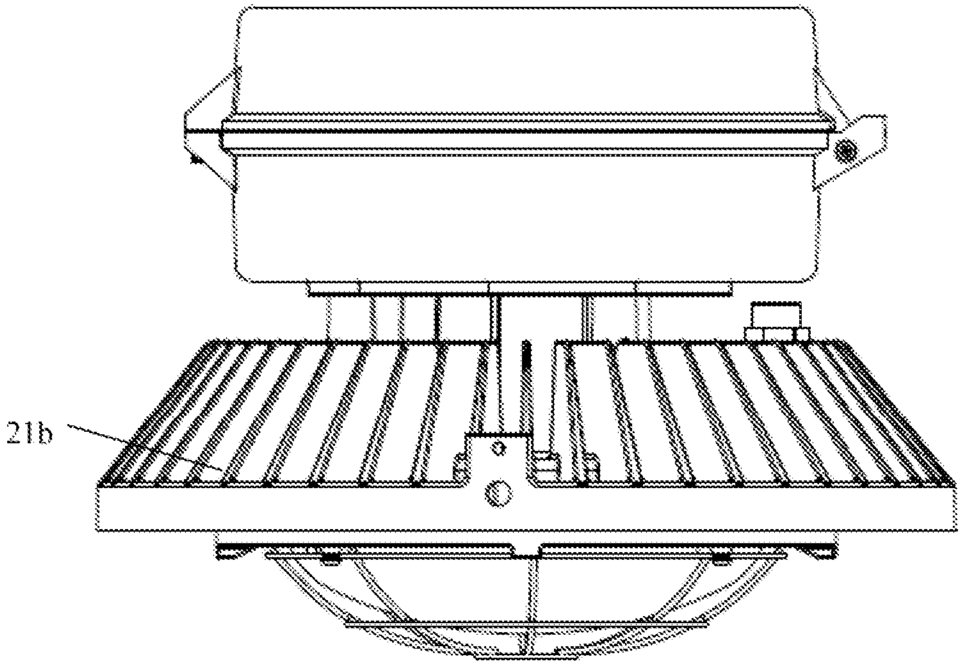
FIG. 6 is a schematic view of an overall structure of an explosion-proof lamp according to a second embodiment of the present utility model.
Figure 7:
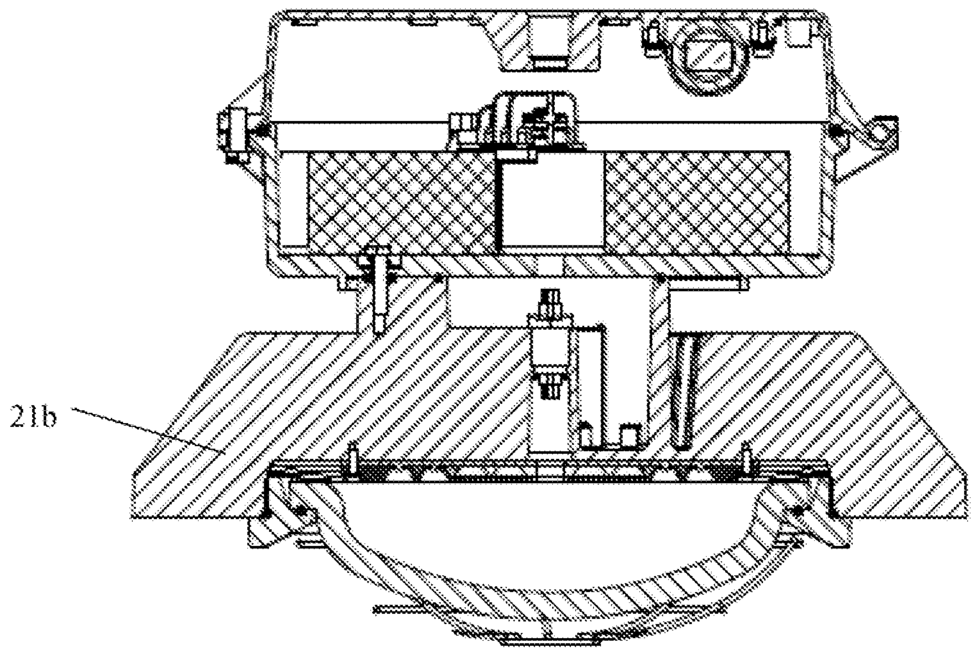
FIG. 7 is a sectional view of the explosion-proof lamp according to the second embodiment of the present utility model.

FIG. 6 and FIG. 7 are respectively a schematic view of an overall structure of an explosion-proof lamp according to a second embodiment of the present utility model and a sectional view of the explosion-proof lamp according to the second embodiment of the present utility model. In the second embodiment shown in FIG. 6 and FIG. 7, the explosion-proof lamp provided by the present utility model has the same main structure as the first embodiment, and differs from the first embodiment in that the structure of a heat sink 21*b* is different from that of the heat sink 21A.

A key to an LED lamp is temperatures, and the temperatures mainly include an LED temperature and a drive temperature. The size of a heat sink is designed according to power, so as to ensure that an LED does not fail due to a high temperature.

In the second embodiment shown in FIG. 6 and FIG. 7, heat dissipation fins of the heat sink 21*b* are separately distributed in a radial annular form, and outer contours of all of the heat dissipation fins form a truncated cone.

The second embodiment has the same overall structure as the first embodiment, and in the second embodiment, the heat dissipation fins of the heat sink 21*b* have larger areas and a better heat dissipation effect, so that maximum output power of the explosion-proof lamp of the second embodiment can be greater that of the explosion-proof lamp of the first embodiment.

The maximum output power of the explosion-proof lamp in the second embodiment is 15 L.

Figure 8:
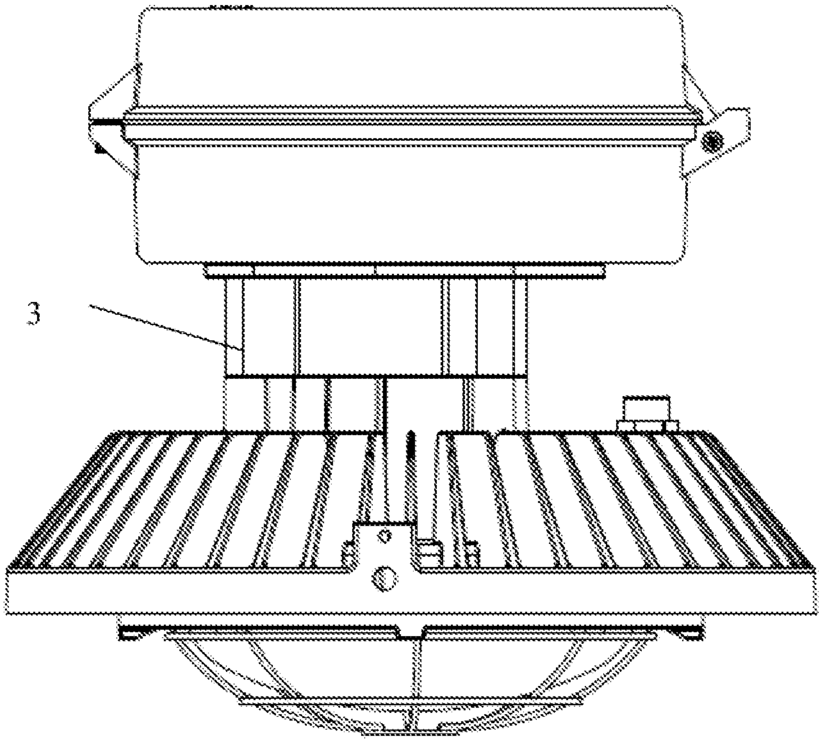
FIG. 8 is a schematic view of an overall structure of an explosion-proof lamp according to a third embodiment of the present utility model.
Figure 9:
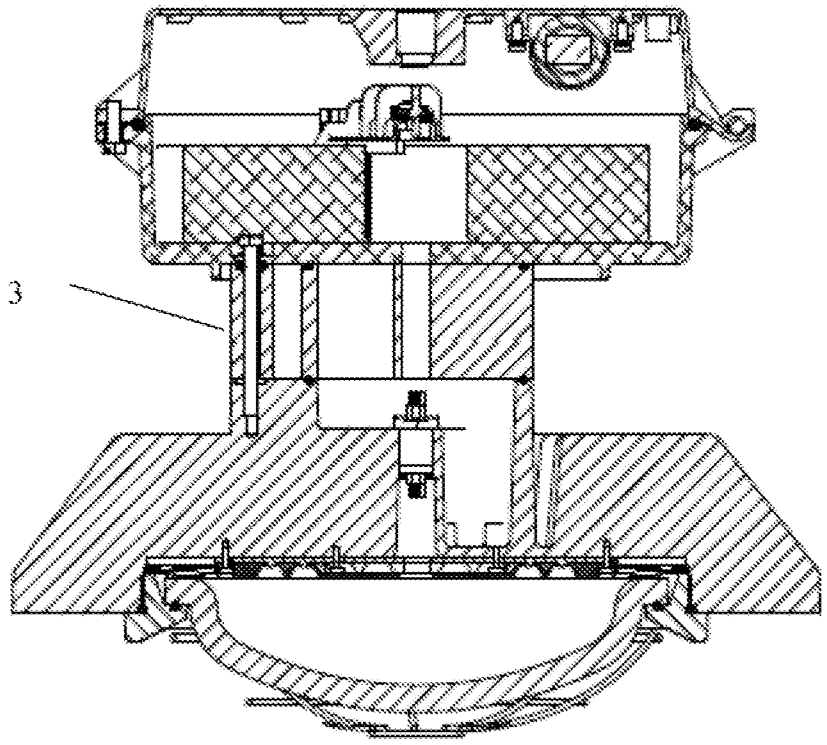
FIG. 9 is a sectional view of the explosion-proof lamp according to the third embodiment of the present utility model.

FIG. 8 and FIG. 9 are respectively a schematic view of an overall structure of an explosion-proof lamp according to a third embodiment of the present utility model and a sectional view of the explosion-proof lamp according to the third embodiment of the present utility model. In the third embodiment shown in FIG. 8 and FIG. 9, the explosion-proof lamp provided by the present utility model has the same main structure as the second embodiment, and differs from the second embodiment in that the explosion-proof lamp in the third embodiment further includes an isolation column 3.

The isolation column 3 is provided between the heat sink of the light source cavity 2 and the drive cavity 1, controls spacing between the light source cavity and the drive cavity, and isolates heat between the light source cavity 2 and the drive cavity 1.

Figure 10A:
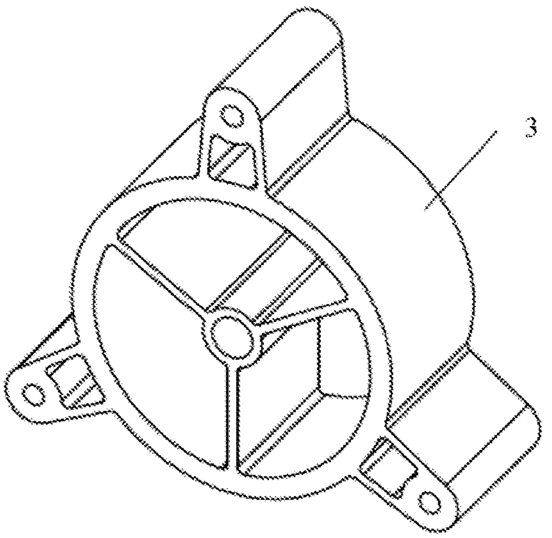
FIG. 10*a* is a perspective view of an isolation column according to the third embodiment of the present utility model.
Figure 10B:
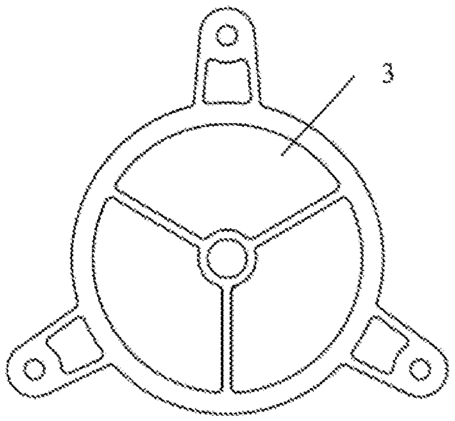
FIG. 10*b* is a top view of the isolation column according to the third embodiment of the present utility model.
Figure 10C:
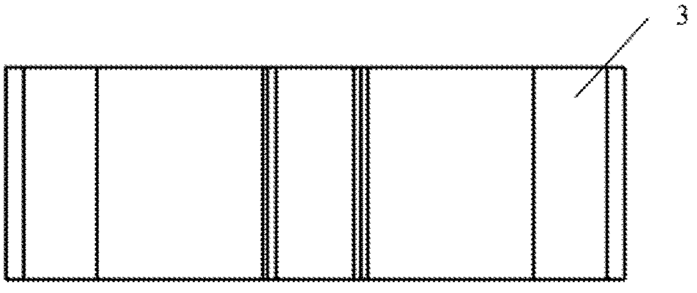
FIG. 10*c* is a front view of the isolation column according to the third embodiment of the present utility model.

FIG. 10*a* to FIG. 10*c* are respectively a perspective view, a top view, and a front view of the isolation column according to the third embodiment of the present utility model. As shown in FIG. 10*a* to FIG. 10*c*, the isolation column 3 is hollow, and a cable in the drive cavity passes through a through hole in the middle, and is connected to the light source in the light source cavity.

The isolation column 3 is made of aluminum by means of extrusion molding, and can be machined to different heights as required.

Heat of the light source cavity 2 and the distance between the light source cavity 2 and the drive cavity 1 affect a temperature of the power driver. When the design of the light source cavity 2 remains unchanged, the temperature of the power driver is adjusted by adjusting the distance between the light source cavity 2 and the drive cavity 1, thereby achieving a better heat dissipation than the second embodiment, and allowing greater output power.

The maximum output power of the explosion-proof lamp in the third embodiment is 25 L, thereby maximumly reducing unit costs and investment of a lamp housing.

The present utility model provides an explosion-proof lamp; the drive cavity is an increased-safety cavity; the light source cavity is a flameproof cavity; the drive cavity and the light source cavity are independent of each other, thereby facilitating heat dissipation on a surface of a lamp housing and a power driver.

An explosion-proof lamp provided by the present utility model specifically has the following beneficial effects:

1) An LED light source is used, has high luminous efficiency, produces less heat, has an operating voltage being a safe and low voltage, is safe and reliable, has a long service life, conserves energy, is environmentally friendly, produces no pollution, and is resistant to vibration and impact.

2) The drive cavity is an increased-safety cavity; a wall thickness of the drive cavity is relatively small, thereby reducing costs and weight, and facilitating maintenance.

3) Heat sinks of different shapes dissipate heat to the outside by means of heat dissipation fins, thereby ensuring a long service life and normal operation of the LED light source.

4) The isolation column is provided to adjust a distance between the drive cavity and the light source cavity, thereby further reducing a temperature of the power driver.

Although the aforementioned methods are illustrated and described as a series of actions for ease of explanation, it should be understood that these methods are not limited by the sequence of the actions. According to one or a plurality of embodiments, some actions can occur according to different orders, and/or occur concurrently together with other actions illustrated and described herein or not illustrated nor described herein but understandable by a person skilled in the art.

As described in the present application and the claims, if not explicitly indicated otherwise by the context, then terms such as “a,” “an,” “one” and/or “this” do not necessarily indicate a singular form, and can also include a plural form. In general, terms “including” and “comprising” only indicate including explicitly denoted steps and elements, but these steps and elements do not constitute an exclusive list, and a method or a device may also include other steps or elements.

The aforementioned embodiments are provided for a person skilled in the art to implement or use the present utility model. A person skilled in the art can make various modification or changes to the aforementioned embodiments without departing from the utility model ideas of the present utility model. Therefore, the protection scope of the present utility model is not limited by the aforementioned embodiments, and should be the maximum scope covering inventive features defined in the claims.

The invention claimed is:

1. An explosion-proof lamp, characterized by comprising a light source cavity and a drive cavity independent of each other, wherein the drive cavity is an increased-safety cavity, is provided therein with a power driver and a junction box, is connected to the light source cavity via a conducting wire by means of an insulating sleeve, and drives and controls a light source in the light source cavity to be turned on;

the light source cavity is a flameproof cavity, and comprises a heat sink, a glass cover, the light source, and a metal frame for securing the glass cover;

the glass cover and the heat sink are connected to form the light source cavity, and the light source is mounted in the light source cavity;

the metal frame comprises (i) an outer vertical edge and an outward protruding shoulder configured to receive a first seal ring, and (ii) an inward protruding shoulder configured to receive a second seal ring, wherein a portion of the heat sink extends in a vertical direction downwards past the light source and is disposed around the outer vertical edge of the metal frame and seated against the outward protruding shoulder of the metal frame, the first seal ring being disposed on the protruding shoulder of the metal frame and between the metal frame and the heat sink, wherein an edge portion of the glass cover extends outwardly and is seated against the inward protruding shoulder of the metal frame, the second seal ring being disposed on the inward protruding shoulder of the metal frame and between the metal frame and the glass cover; and the heat sink comprises a heat dissipation bottom plate and a plurality of heat dissipation fins annularly mounted on the heat dissipation bottom plate, absorbs heat generated in the light source cavity, and dissipates the heat into an external environment.

2. The explosion-proof lamp according to claim 1, wherein:

the heat dissipation fins of the heat sink are separately distributed in a radial annular form; and outer contours of all of the heat dissipation fins of the heat sink form a cylinder.

3. The explosion-proof lamp according to claim 1, wherein:

the heat dissipation fins of the heat sink are separately distributed in a radial annular form; and outer contours of all of the heat dissipation fins of the heat sink form a truncated cone.

4. The explosion-proof lamp according to claim 2, further comprising an isolation column provided between the heat sink of the light source cavity and the drive cavity and used to control spacing between the light source cavity and the drive cavity.

5. The explosion-proof lamp according to claim 1, wherein:

the light source is an LED light source.

6. The explosion-proof lamp according to claim 1, wherein:

a metal mesh is further provided on an outer side of the glass cover, and surrounds the glass cover from the outer side.

7. The explosion-proof lamp according to claim 5, wherein:

in the light source cavity, the LED light source is mounted on a mounting plate, and the mounting plate is mounted on the heat dissipation bottom plate of the heat sink.

8. The explosion-proof lamp according to claim 1, further comprising an upper cover connected to the drive cavity and used to close the drive cavity and provide a mounting position for the explosion-proof lamp.

9. The explosion-proof lamp according to claim 1, wherein the metal frame and the heat dissipation bottom plate are threadingly connected to achieve explosion proofness based on flameproofness.

10. The explosion-proof lamp according to claim 8, wherein a third seal ring is mounted between the upper cover and the drive cavity.

11. The explosion-proof lamp according to claim 3, further comprising an isolation column provided between the heat sink of the light source cavity and the drive cavity and used to control spacing between the light source cavity and the drive cavity.

* * * * *